United States Patent

Kuhnert

[11] Patent Number: 5,819,874
[45] Date of Patent: Oct. 13, 1998

[54] FOOT PLATFORM DEVICE

[76] Inventor: Bradley A. Kuhnert, Box 201, Solon Springs, Wis. 54873

[21] Appl. No.: 863,224

[22] Filed: May 27, 1997

Related U.S. Application Data

[63] Continuation-in-part of Ser. No. 685,988, Jul. 22, 1996, abandoned.

[51] Int. Cl.[6] ................................................ A45F 3/26
[52] U.S. Cl. ........................ 182/187; 182/188; 182/136
[58] Field of Search ................................. 182/188, 136, 182/137, 138, 133, 134, 135, 187

[56] References Cited

U.S. PATENT DOCUMENTS

| | | | |
|---|---|---|---|
| 4,782,918 | 11/1988 | Brunner et al. | 182/187 |
| 4,936,416 | 6/1990 | Garon | 182/187 |
| 5,060,756 | 10/1991 | D'Acquisto | 182/187 |
| 5,143,177 | 9/1992 | Smith | 182/136 X |
| 5,186,276 | 2/1993 | Craig | 182/187 |
| 5,439,074 | 8/1995 | Trout et al. | 182/187 |
| 5,462,135 | 10/1995 | Ambler et al. | 182/188 X |

*Primary Examiner*—Ramon O. Ramirez
*Assistant Examiner*—Long Dinn Phan

[57] ABSTRACT

The present invention relates to a foot platform device which is adapted to support a hunter within a tree. In use, the foot platform is first strapped to a tree. The hunter then supports himself with the aid of both a chest strap and the foot platform. In the preferred embodiment, the foot platform includes an upper foot rest and a lower larger footrest. Furthermore, each of these foot rests are angled relative to the other components of the foot platform.

7 Claims, 6 Drawing Sheets

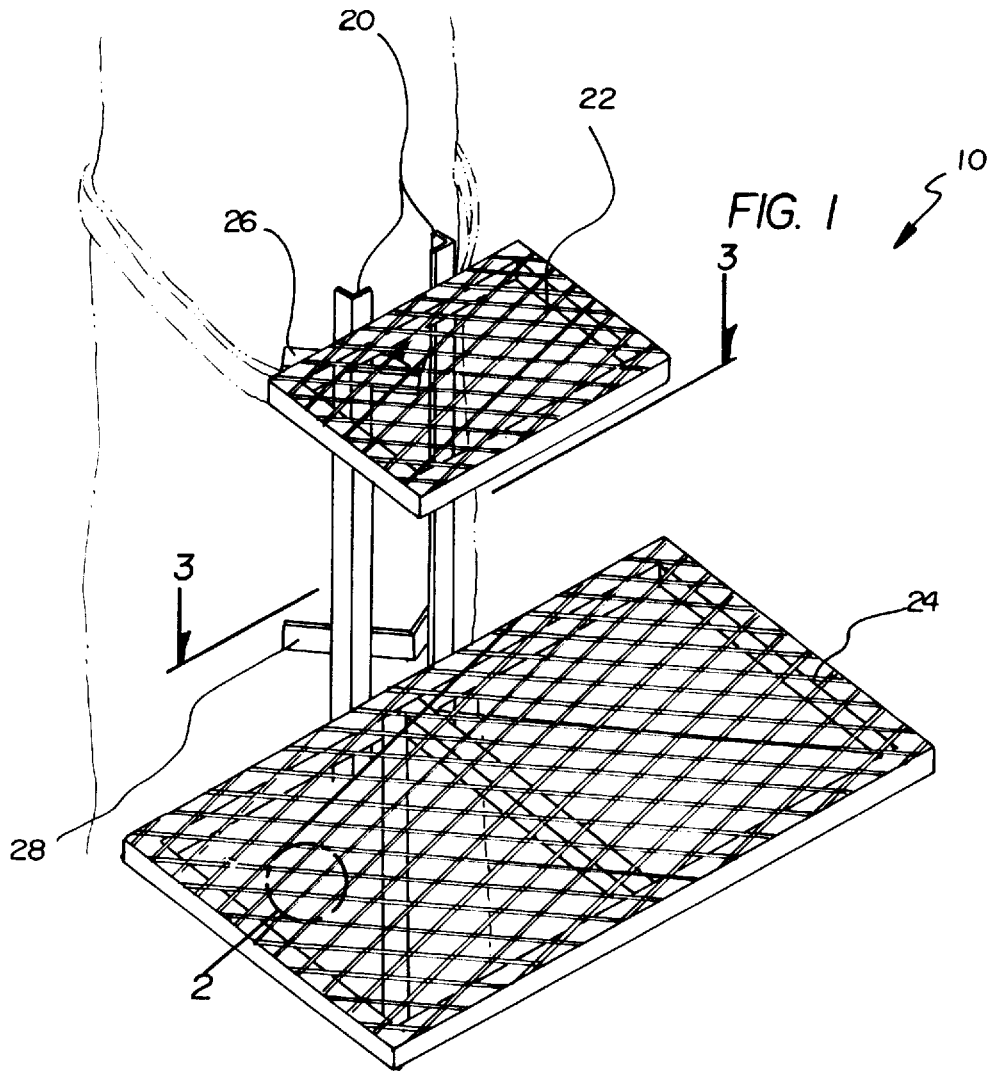
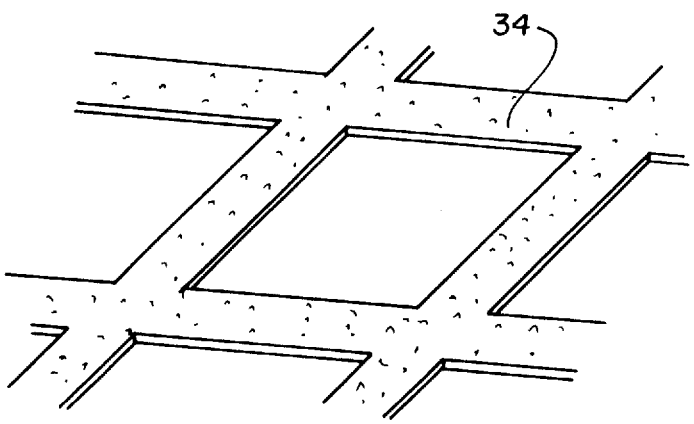

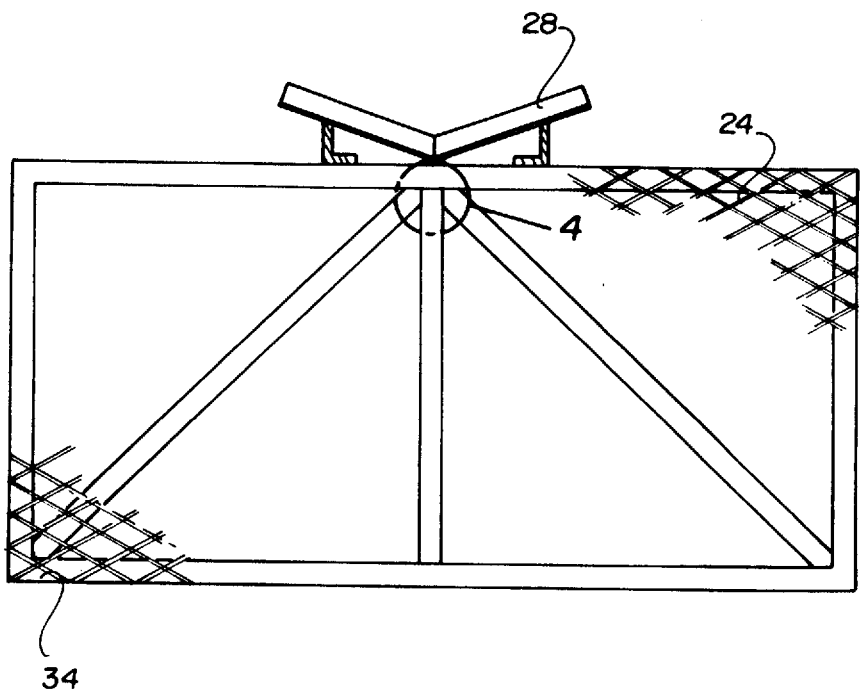
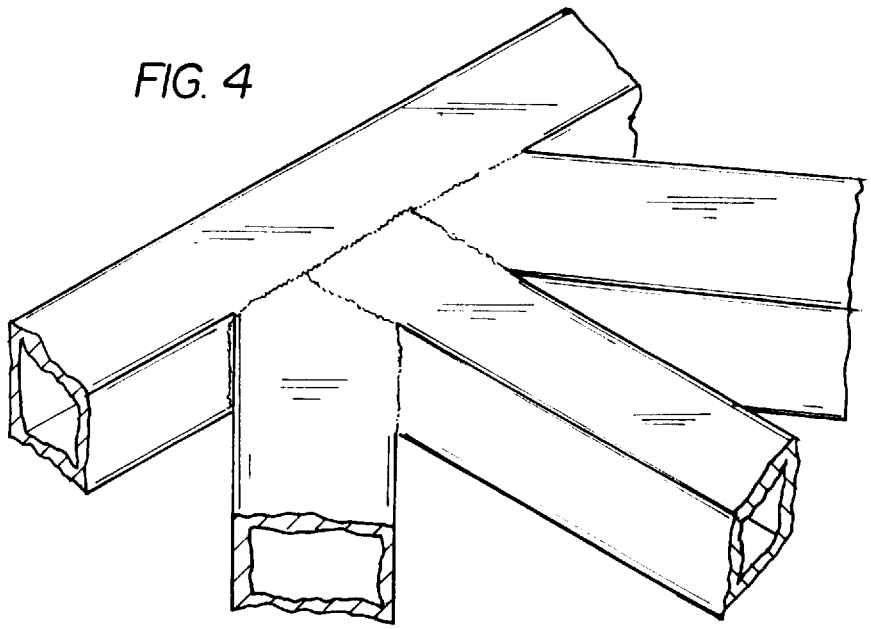

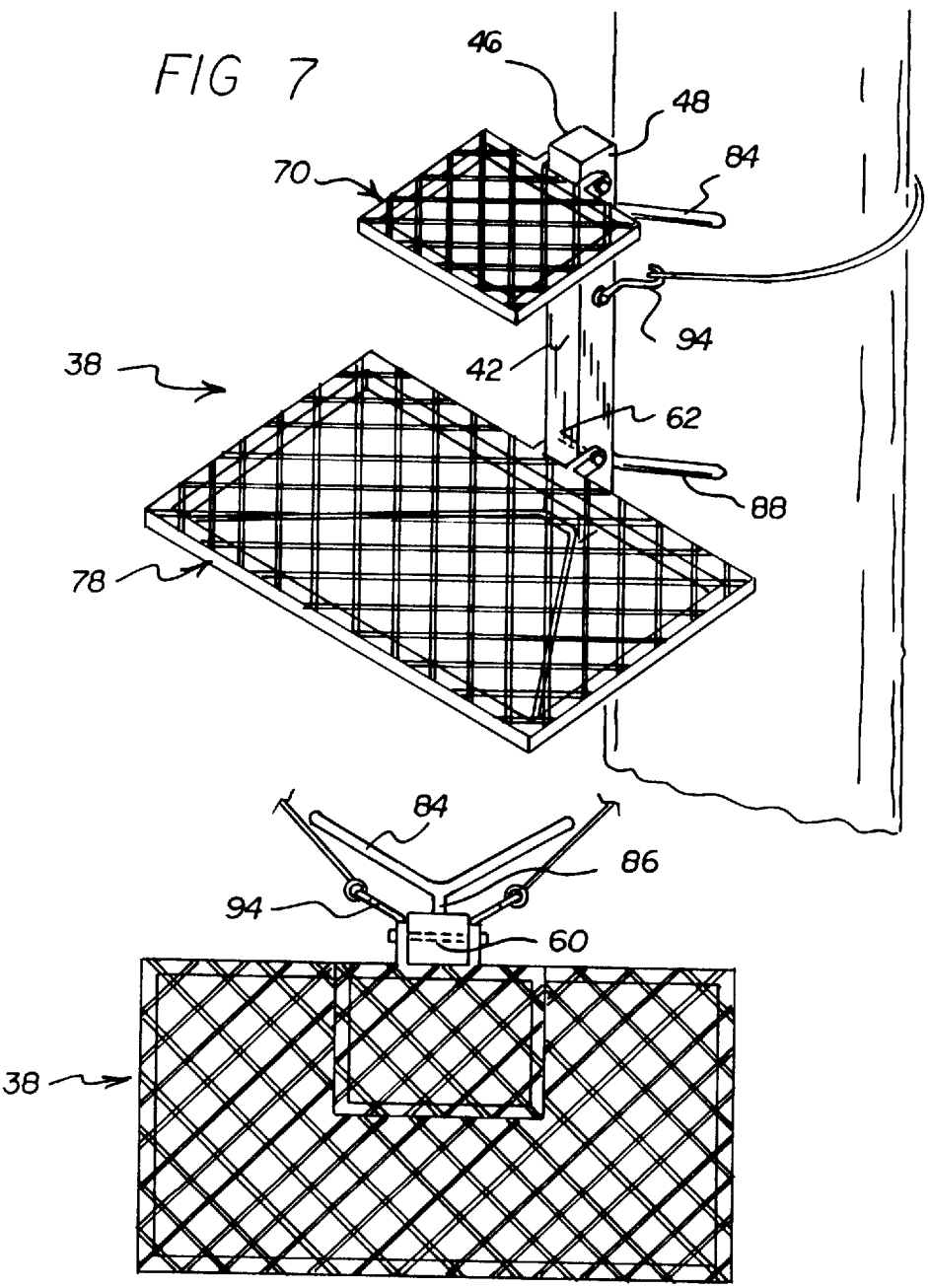

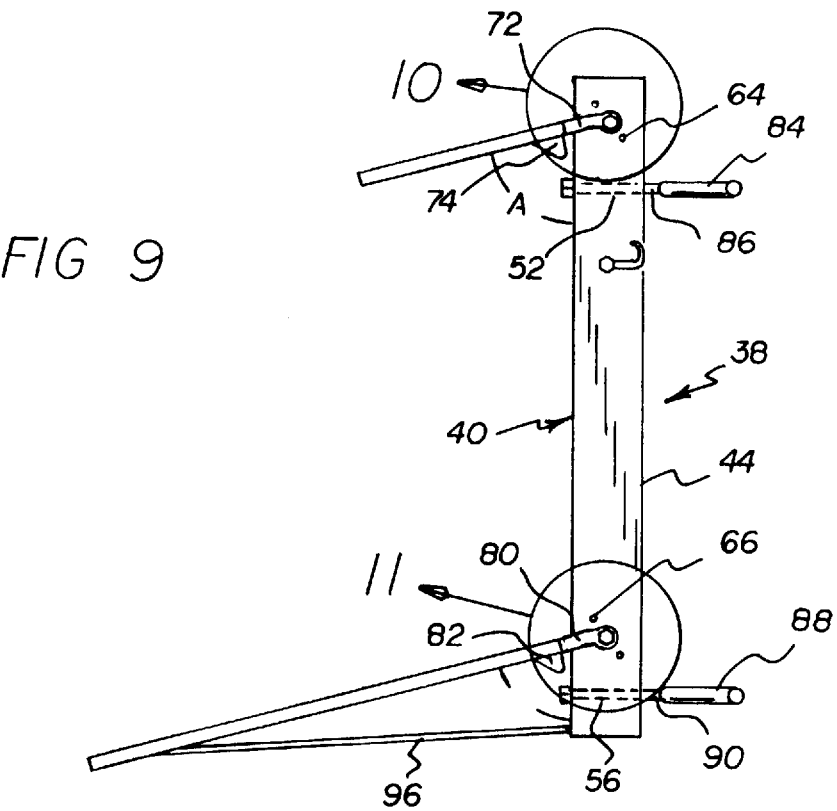
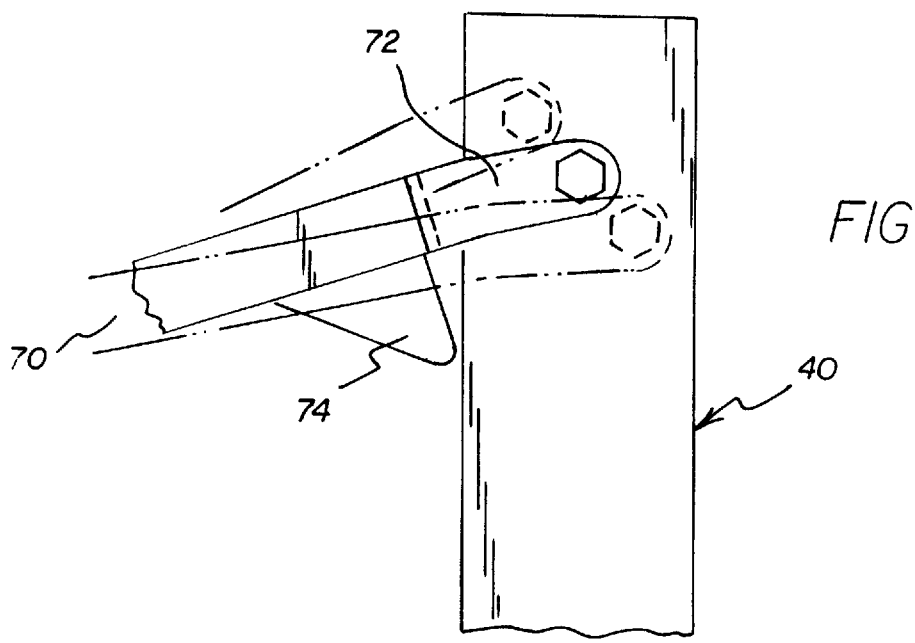

FOOT PLATFORM DEVICE

This is a Continuation-In-Part of U.S. application Ser. No. 08/685,988 filed Jul. 22, 1996, which now is abandoned. All subject matter set forth in application Ser. No. 08/685,988 is hereby incorporated by reference into the present application as if fully set forth herein.

BACKGROUND OF THE INVENTION

1. Field of the Invention

The present invention relates to a foot platform device and more particularly pertains to a device which enables a downward vantage point from a tree.

2. Description of the Prior Art

The use of tree stands is known in the prior art. More specifically, tree stands heretofore devised and utilized for the purpose of supporting a user in a tree are known to consist basically of familiar, expected, and obvious structural configurations, notwithstanding the myriad of designs encompassed by the crowded prior art which has been developed for the fulfillment of countless objectives and requirements.

For example, U.S. Pat. No. 4,723,630 to Wolford et al. Discloses a tree stand with an adjustable foot rest. U.S. Pat. No. 4,552,246 to Thomas discloses a portable hunter tree stand. U.S. Pat. Des. 354,143 to Floyd, Jr. discloses a hunter's tree stand. U.S. Pat. No. 5,439,074 to Trout et al. discloses a foldable and portable tree stand. U.S. Pat. No. 4,579,198 to Lee discloses a collapsible tree stand assembly. Lastly, U.S. Pat. No. 5,186,276 to Craig discloses a portable hunting tree stand.

In this respect, the foot platform device according to the present invention substantially departs from the conventional concepts and designs of the prior art, and in doing so provides an apparatus primarily developed for the purpose of enabling a downward vantage point from a tree.

Therefore, it can be appreciated that there exists a continuing need for a new and improved foot platform device which can be used for supporting a user in a tree. In this regard, the present invention substantially fulfills this need.

SUMMARY OF THE INVENTION

In view of the foregoing disadvantages inherent in the known types of tree stands now present in the prior art, the present invention provides an improved foot platform device. As such, the general purpose of the present invention, which will be described subsequently in greater detail, is to provide a new and improved foot platform device and method which has all the advantages of the prior art and none of the disadvantages.

To attain this, the present invention essentially comprises a foot platform adapted to support a hunter within a tree. The platform comprising a pair of vertically oriented L-shaped channels, with each of the channels having an upper extent, a lower extent and a length, and a 90 degree angle formed within the length of each of the channels. The device further includes an upper grated platform measuring approximately 4 inches deep and 4 inches wide and constructed primarily from metal. The upper grated platform has an upper surface and a lower surface. The upper platform is secured to the upper extents of the pair of channels. An angle is formed between the vertically oriented channels and the upper platform, this angle is less than 90 degrees. The device also includes a lower grated platform measuring approximately 8 inches deep and 18 inches wide and constructed primarily from metal. The lower grated platform has an upper surface and a lower surface. This lower platform is secured to the lower extent of the pair of channels. An angle is formed between the vertically oriented channels and the lower platform, this angle is less than 90 degrees. An angled upper tree engaging brace is employed in securing the device to a tree. This brace has a length, and a 90 degree angle formed within its length. The upper tree engaging brace is secured to the upper extents of the pair of channels. An angled lower tree engaging brace is also employed. This lower brace has a length, and a 90 degree angle formed within its length. The lower tree engaging brace is secured to the lower extents of the pair of channels. A rope chain or strap hook is employed in securing the device to a tree. The strap hook or hoop is secured to the upper extent of one of the pair of channels. A textured non-slip material covers the upper surface of the upper platform, and a textured non-slip material covers the upper surface of the lower platform.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved foot platform device which has all the advantages of the prior art tree stands and none of the disadvantages.

It is another object of the present invention to provide a new and improved foot platform device which may be easily and efficiently manufactured and marketed.

It is a further object of the present invention to provide a new and improved foot platform device which is of durable and reliable constructions.

An even further object of the present invention is to provide a new and improved foot platform device which is susceptible of a low cost of manufacture with regard to both materials and labor, and which accordingly is then susceptible of low prices of sale to the consuming public, thereby making such foot platform device economically available to the buying public.

Even still another object of the present invention is to afford a user a downward vantage point from a tree.

Lastly, it is an object of the present invention to provide a new and improved foot platform which is adapted to support a hunter within a tree. In use, the foot platform is first strapped to a tree. The hunter then supports himself with the aid of both a chest strap and the foot platform. In the preferred embodiment, the foot platform includes an upper foot rest and a lower larger foot rest. Furthermore, each of these foot rests are angled relative to the other components of the foot platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the foot platform device constructed in accordance with the principles of the present invention.

FIG. 2 is a detailed view of the texture surface employed in the present invention taken from FIG. 1.

FIG. 3 is a view taken along line 3—3 of FIG. 1.

FIG. 4 is a detailed view taken from FIG. 3.

FIG. 7, is perspective view of the alternative embodiment of the foot platform device constructed in accordance with the principles of the present invention.

FIG. 8, is a top plan view of the alternative embodiment of FIG. 7.

FIG. 9, is a side elevational view of the alternative embodiment of FIG. 8.

FIG. 10, is an enlarged view of a movable component of the present invention taken at position 10 of FIG. 9.

The same reference numerals refer to the same parts through the various Figures.

DESCRIPTION OF THE PREFERRED EMBODIMENT

Figure 5:
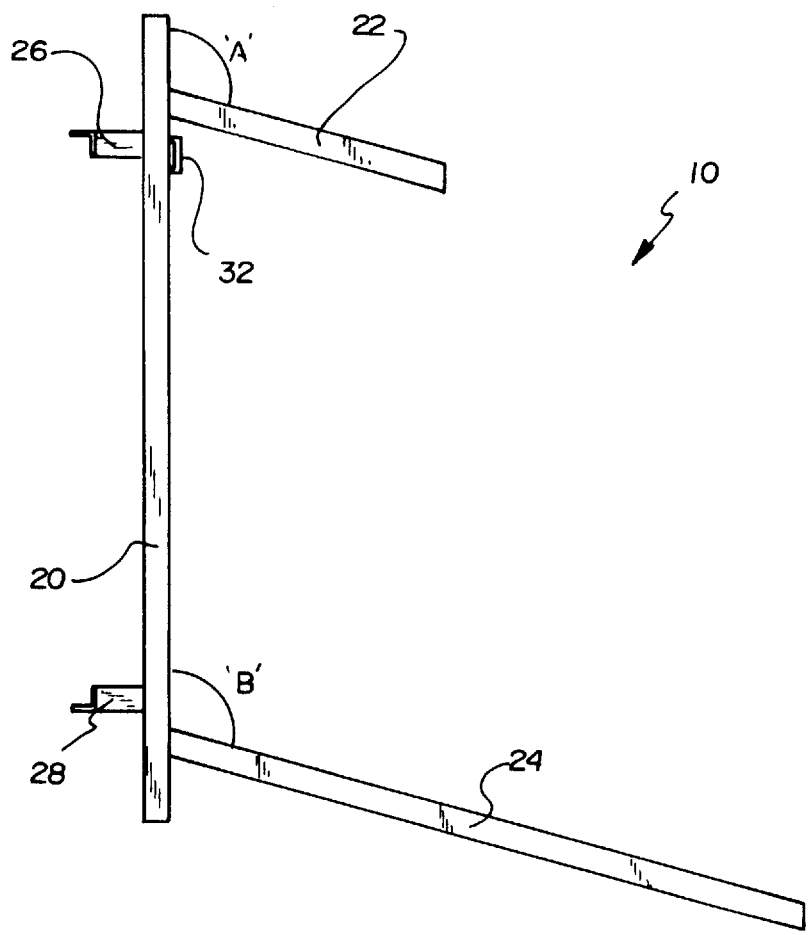
FIG. 5 is a side elevational view of the present invention.

With reference now to the drawings, and in particular to FIG. 1 thereof, the preferred embodiment of the new and improved foot platform device embodying the principles and concepts of the present invention and generally designated by the reference numeral 10 will be described.

The present invention relates to a foot platform which is adapted to support a hunter within a tree. Alternatively, the present invention can be used to support a worker upon a utility pole. In use, the foot platform is first strapped to a tree. The user then supports himself with the aid of both a chest strap and the foot platform. In the preferred embodiment, the foot platform includes an upper foot rest and a lower larger foot rest. Furthermore, each of these foot rests are angled relative to the other components of the foot platform. The various components of the present invention, and the manner in which they interrelate, will be described in greater detail hereinafter.

The main means of support for the foot platform device 10 consists of a pair of vertically oriented L-shaped channels 20. Each of these channels 20 is defined by an upper extent, a lower extent and a length. Furthermore, in the preferred embodiment, a 90 degree angle is formed within the length of each of the channels 20. This 90 degree angle affords rigidity and strength to each channel. The pair of channels 20 is best illustrated in FIG. 1. The channels 20, in the preferred embodiment, are constructed from metal.

The foot platform device 10 of the present invention includes an upper grated platform 22. This upper platform 22 is specifically adapted to support the foot of a user. In the preferred embodiment, this upper platform 22 measures approximately 4 inches deep and 4 inches wide, although other dimensions would suffice. As with the vertically oriented channels 20, the upper platform 22 is constructed primarily from metal. Furthermore, the upper platform 22 is defined by an upper surface and a lower surface. As is illustrated in FIG. 1, the upper platform 22 is secured to the upper extents of the pair of channels 20. In this securement, the angle formed between the vertically oriented channels 20 and the upper platform 22 is less than 90 degrees. More specifically, in the preferred embodiment, the angle indicated as "A" in FIG. 5 is between 95–130 degrees. This angling of the platform 22 with respect to the channels enables a hunter to obtain a downward vantage point when hunting. Furthermore, although the foot platform has been described as grated a non-grated platform can also be utilized. More specifically a non-grated wood or plastic platform is preferred when the present invention is employed upon a utility pole.

The use of this upper platform will allow the user to shift the weight from one leg to the other if needed. More importantly the use of this upper platform will allow a hunter a 360° shooting radius and allow the hunter to shoot straight down.

The lower grated platform 24, in the preferred embodiment, measures approximately 8 inches deep and 18 inches wide, although other dimensions would suffice. As with the other components of the device 10, the lower platform 24 is constructed primarily from metal. The lower platform 24 is defined by both an upper surface and a lower surface. The lower platform is secured to the lower extents of the pair of channels. As with the upper platform 22, the angle formed between the vertically oriented channels and the lower platform 24 is less than 90 degrees. More specifically, the angle indicated as "B" in FIG. 5 is between 90–125 degrees. Again, this angling enables the user of the device 10 to obtain a downward vantage point. Furthermore, although the lower platform has been described as grated a non-grated platform will also suffice. More specifically, a non-grated wood or plastic platform is preferred when the present invention is employed upon utility poles.

In order to help secure the foot platform device 10 of the present invention to a tree two tree engaging braces are employed. More specifically, the device 10 includes an angled upper tree engaging brace defining a length. The upper tree engaging brace is V-shaped. A 90 degree angle is formed within the length of the brace. This 90 degree angle gives the brace an increased amount of rigidity and strength. As depicted in FIG. 5, the upper tree engaging brace is secured to the upper extents of the pair of channels 20. Furthermore, as illustrated in FIG. 1, the upper brace 26 has a first and second half which are angled with respect to one another.

The foot platform device 10 of the present invention also includes a lower angled tree engaging brace that is V-shaped. This lower brace 28 is defined, in part, by a length. Furthermore, a 90 degree angle is formed within the length of the brace. This 90 angle gives the brace a degree of strength and rigidity. The lower tree engaging brace is secured to the lower extents of the pair of channels 20. As with the upper brace 26, the lower brace 28 includes a first and second half which are angled with respect to one another.

With the use of this type of upper and lower engaging brace, the user is allowed to attach to multiple sized and shaped trees or poles.

Figure 6:
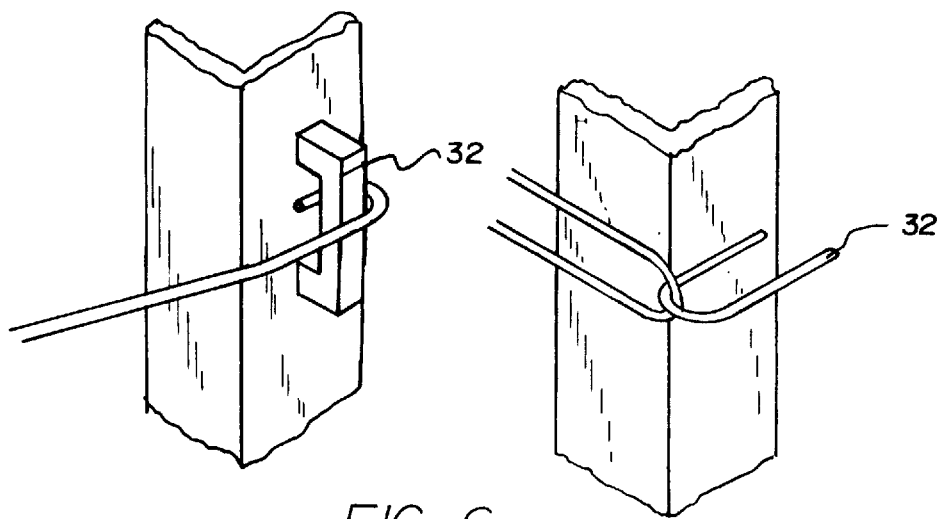
FIG. 6 is a detailed view of both the strap hook and the strap hoop.

The foot platform device 10 of the present invention is secured to a tree by way of at least one strap hoop or hook 32. As illustrated in FIG. 6, the strap hook is secured to the upper extent of one of the pair of channels 20. In the preferred embodiment, only one such strap hook is employed. In securing the device 10 of the present invention to a tree, a securing strap rope, or chain, is passed around the tree and through the strap hook 32. The opposite portion of the securing strap is secured to the opposite vertical channel by way of a threaded fastener. This arrangement secures the upper extent of the device 10 to the tree. The user's weight is then employed in cantilevering the lower extent of the device 10 upon the tree. The overall device has a total height of approximately 9 inches which facilitates its portability.

In an alternative embodiment of the upper and lower platforms, a textured non-slip 34 material covers both the upper surface of the upper platform 22 and the upper surface of the lower platform 24. This ensures proper footing for a user of the device 10. This material also provides a degree of noise suppression. The noise suppression facilitates the use of the present invention while hunting.

Figure 12:
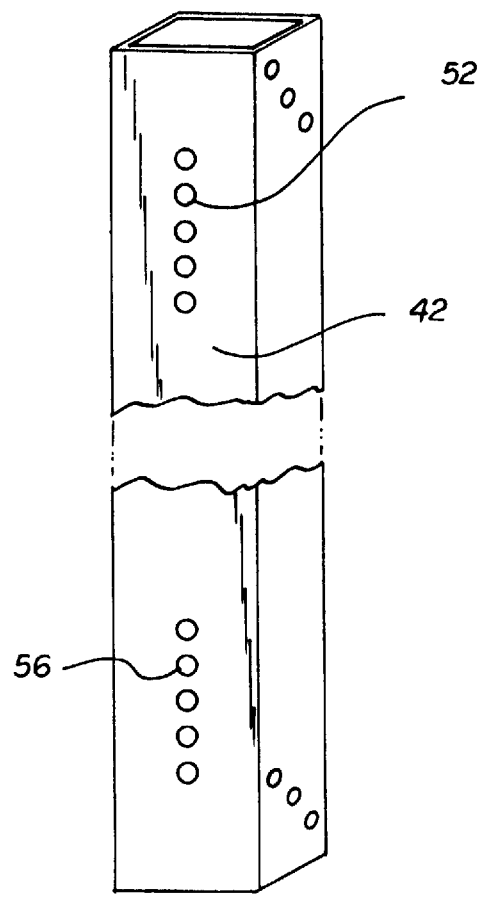
FIG. 12, in an isometric view of the channel of the second embodiment of the present invention.

A second embodiment 38 of the present invention, as shown in FIGS. 7 and 9, is provided. This second embodiment includes a vertically oriented rectangular channel 40. The channel has an upper extent, a lower extent and a length. The channel has a front wall 42, a rear wall 44 and a pair of side walls. The pair of side walls form a first side wall 46 and a second side wall 48. The channel has a plurality of upper bore holes 52 and a plurality of lower bore holes 56. Each of the upper and lower bore holes extend axially through the front wall and the rear wall, as shown in FIG. 9. FIG. 12 shows that the plurality of the upper bore holes is positioned within the upper extent. Also, the plurality of lower bore holes is positioned within the lower extent. The channel has a second pair of bore holes extending axially through the first and second side wall, the second pair of bore holes 60 and 62 forming an upper bore hole 60 and a lower bore hole 62. The upper bore hole is spaced from one of the first pair of bore holes. The lower bore hole spaced from another of the first pair of bore holes. The rectangular channel has four additional bore holes extending axially through the side walls. Two 64 of the four bore holes are through the upper extent of the rectangular channel. Another two 66 of the four additional bore holes are through the lower extent of the rectangular channel.

Included with the second embodiment is an upper platform 70. The upper platform measures approximately 4 inches deep and 4 inches wide and constructed primarily from metal, as seen in FIG. 8. The upper platform is defined by an upper surface and a lower surface. The upper platform has a pair of brackets 72 projecting rearwardly, as shown in FIG. 9. A stop 74 being fixedly attached to the upper platform and adjacent the pair of brackets. The pair of brackets each have an opening that aligns with the upper bore hole and allows the upper platform to be rotatably mounted to the upper extent of the rectangular channel. The rotatable mounting method allows the upper platform to be rotated up or down to change the angle of the upper platform, as shown in FIG. 10. The angle "A" shown in FIG. 9 and formed between the vertically oriented rectangular channel and the upper platform is less than 90 degrees. Additionally, the pair of brackets of the upper platform may be aligned with any of the other bore holes 64 of the rectangular channel. This will allow the angle formed between the rectangular channel and upper platform to vary.

Figure 11:
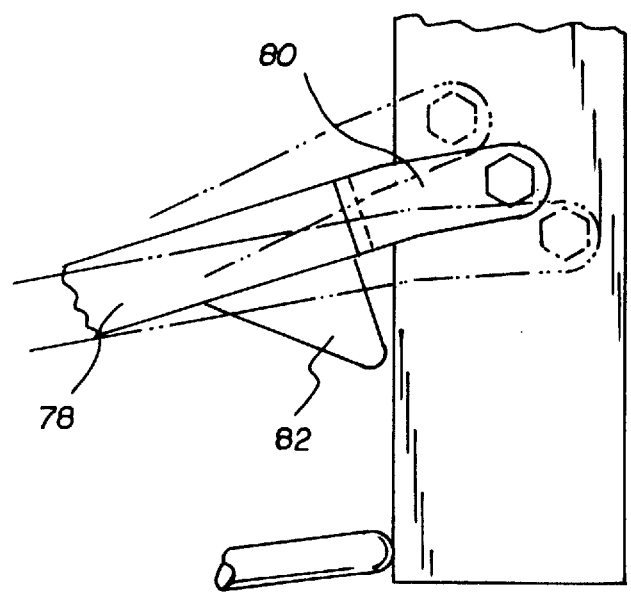
FIG. 11, is an enlarged view of a movable component of the present invention taken at position 11 of FIG. 10.

Also, a lower platform 78 is provided. The lower platform measures approximately 8 inches deep and 18 inches wide and constructed primarily from metal. The lower platform is defined by an upper surface and a lower surface. The lower platform has a pair of brackets 80 extending rearwardly, as shown in FIG. 9. A stop 82 is fixedly attached to the lower platform and adjacent the pair of brackets. The pair of brackets each have an opening that is aligned with the lower bore hole for allowing the lower platform to be rotatably mounted to the lower extent of the rectangular channel. The rotatable mounting method allows the lower platform to be rotated up or down to change the angle of the lower platform, as shown in FIG. 11. The angle "B" shown in FIG. 9 and formed between the vertically oriented rectangular channel and the lower platform is less than 90 degrees. The pair of brackets of the lower platform may be aligned with any of the bore holes 66 of the rectangular channel. This will allow the angle formed between the rectangular channel and the lower platform to vary.

The upper and lower platforms need not be perfectly square on the sides. The upper and lower platforms may be odd shaped or even rooned. The side of the upper and lower platforms could be slanted down.

In order to secure the second embodiment of the present invention to a tree, two tree engaging braces continue to be employed. One such device is a Y-shaped upper tree engaging brace. The Y-shaped brace is formed of a V-shaped member 84 with a length and an elongated portion 86. The V-shaped member of the upper tree engaging brace has a 90 degree angled formed within the length. The elongated portion is positioned through one of the plurality of upper bore holes pair of bore holes 52 for securing to the upper extent of the channel. The elongated portion is threaded at the tip for receiving a nut.

Included is a Y-shaped lower tree engaging brace that is formed of a V-shaped member 88 with a length and an elongated portion 90. The V-shaped member of the lower tree engaging brace has a 90 degree angle formed within the length. The elongated portion is positioned through one of the plurality of lower bore holes 56 for securing to the lower extent of the channel. The elongated portion of the Y-shaped lower tree engaging brace is treaded at the tip for receiving a nut.

The plurality of upper bore holes 52 and the plurality of lower bore holes 56 are used to allow the repositioning of the upper and lower Y-shaped tree engaging braces. The user of the invention can relocated the braces as needed for positioning the platform around the tree.

Additionally, the second embodiment has a pair of strap hooks 94. As illustrated in FIGS. 7 and 8, the strap hooks are coupled to the upper extent of the rectangular channel. In securing the device 38 of the second embodiment of the present invention to a tree, a securing strap rope, or chain, is passed around the tree. The securing strap or chain has end loops that can engage the strap hooks 94. This arrangement secures the upper extent of the device 38 to the tree. As set forth in the first embodiment, The user's weight is then employed in cantilevering the lower extent of the device 38 upon the tree. The overall device has a total height of approximately 9 inches which facilitates its portability.

Finally, a pair of support rods 96 are used to provide additional support to the lower extent 78. Each support rod has one end coupled to the lower extent of the rectangular channel and another secured to the front corner of the lower platform. The one end of each support rod that is coupled to the lower extent may or may not be fixedly attached. FIG. 9 depicts the arrangement of the support rods.

Furthermore, the second embodiment has a textured non-slip material 34 covering both the upper surface of the upper platform and upper surface of the lower platform. This ensures proper footing for a user of the device 70. This material, as shown in FIG. 2, also provides a degree of noise suppression. The noise suppression facilitates the use of the second embodiment of the present invention while hunting.

In use, the device is secured to a tree by passing a securing strap about the tree and through at least one strap hook. With the securement completed, the user may step upon the device. Additional securement for the user can be afforded by way of a strap interconnecting the user and the tree. In this manner the user is afforded a hands free downward vantage point.

Also, each support rod is attached to each front corner of the lower platform and runs back to the vertically oriented rectangular channel unit. A number of holes are bored through the front wall and rear wall of the rectangular channel unit to allow the position of the engaging braces to be changed as needed. These engaging braces could be fixedly attached as permanent parts of the upper and lower platform and not separate components. By changing the position of the engaging braces the stand is allowed to fit on odd sized and shaped trees and poles. This also is another way to change the angle of the lower and upper platforms.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A foot platform adapted to support a user comprising in combination:
   a pair of vertically oriented L-shaped channels, each of the channels having an upper extent, a lower extent and a length, a 90 degree angle formed within the length of each of the channels;
   an upper platform measuring approximately 4 inches deep and 4 inches wide and constructed primarily from metal, the upper platform having an upper surface and a lower surface, the upper platform secured to the upper extents of the pair of channels, the angle formed between the vertically oriented channels and the upper platform being less than 90 degrees;
   a lower platform measuring approximately 8 inches deep and 18 inches wide and constructed primarily from metal, the lower platform having an upper surface and a lower surface, the lower platform is secured to the lower extents of the pair of channels, the angle formed between the vertically oriented channels and the lower platform being less than 90 degrees;
   an angled upper tree engaging brace having a length, a 90 degree angle formed within the length, the upper tree engaging brace secured to the upper extents of the pair of channels;
   an angled lower tree engaging brace having a length, a 90 degree angle formed within the length, the lower tree engaging brace secured to the lower extents of the pair of channels;
   a textured non-slip material covering the upper surface of the upper platform; and
   a textured non-slip material covering the upper surface of the lower platform.

2. A foot platform adapted to support a user comprising in combination:
   a pair of vertically oriented L-shaped channels, each of the channels having an upper extent, a lower extent and a length;
   an upper platform having an upper surface and a lower surface, the upper platform secured to the upper extents of the pair of channels, the angle formed between the vertically oriented channels and the upper platform being less than 90 degrees;
   a lower platform having an upper surface and a lower surface, the lower platform secured to the lower extents of the pair of channels, the angle formed between the vertically oriented channels and the lower platform being less than 90 degrees;
   a V-shaped angled upper tree engaging brace having a length, the upper tree engaging brace secured to the upper extents of the pair of channels; and
   a v-shaped angled lower tree engaging brace having a length, the lower tree engaging brace secured to the lower extents of the pair of channels.

3. The foot platform as described in claim 2 wherein:
   the upper platform measures approximately 4 inches deep and 4 inches wide and is constructed primarily from metal; and
   the lower platform measures approximately 8 inches deep and 18 inches wide and is constructed primarily from metal.

4. The foot platform as described in claim 2 further comprising:
   a textured non-slip material covering the upper surface of the upper platform;
   a textured non-slip material covering the upper surface of the lower platform.

5. The foot platform as described in claim 2 wherein:
   a 90 degree angle is formed within the length of each of the vertically oriented channels; and
   a 90 degree angle is formed within the length of the upper tree engaging brace; and
   a 90 degree angle is formed within the length of the lower tree engaging brace.

6. A foot platform adapted to support a user comprising in combination:

a vertically oriented rectangular channel, the channel having an upper extent, a lower extent and a length, the channel having a front wall, a rear wall and a pair of side walls therebetween, the pair of side walls forming a first side wall and a second side wall, the channel having a plurality of upper bore holes and a plurality of lower bore holes extending axially through the front wall and the rear wall, the plurality of upper bore holes being positioned within the upper extent, the lower plurality of bore holes being positioned within the lower extent, the channel having a second pair of bore holes extending axially through the first and second side wall, the second pair of bore holes forming an upper bore hole and a lower bore hole, the upper bore hole being spaced from one of the first pair of bore holes, the lower bore hole being spaced from another of the first pair of bore holes;

an upper platform measuring approximately 4 inches deep and 4 inches wide and constructed primarily from metal, the upper platform having an upper surface, a lower surface and a pair of brackets projecting rearwardly therefrom, a stop being fixedly attached to the upper platform and adjacent the pair of brackets, the pair of brackets being aligned with the upper bore hole for allowing the upper platform to be rotated up or down for changing the angle of the upper platform when mounted to the upper extent of the channel, the angle formed between the vertically oriented channel and the upper platform being less than 90 degrees;

a lower platform measuring approximately 8 inches deep and 18 inches wide and constructed primarily from metal, the lower platform having an upper surface, a lower surface and a pair of brackets extending rearwardly therefrom, a stop being fixedly attached to the lower platform and adjacent the pair of brackets, the pair of brackets being aligned with the lower bore hole for allowing the lower platform to be rotated up or down for changing the angle of the upper platform when mounted to the lower extent of the channel, the angle formed between the vertically oriented channel and the lower platform being less than 90 degrees;

a Y-shaped upper tree engaging brace being formed of a V-shaped member with a length and an elongated portion, the V-shaped member having a 90 degree angled formed within the length, the elongated portion being positioned through one of the first pair of bore holes for securing to the upper extent of the channel;

a Y-shaped lower tree engaging brace being formed of a V-shaped member with a length and an elongated portion, the V-shaped member having a 90 degree angle formed within the length, the elongated portion being positioned through another of the first pair of bore holes for securing to the lower extent of the channel;

a textured non-slip material covering the upper surface of the upper platform; and a textured non-slip material covering the upper surface of the lower platform.

7. The foot platform as described in claim 6 further including:

a support rod being attached to each of a front corner of the lower platform and extending back to the channel;

a plurality of holes being bored through the front wall and rear wall of the channel for allowing the position of the engaging braces to be changed; and the engaging braces being capable of changing positions for allowing the channel to be positioned about odd sized and shaped trees and poles.

* * * * *